No. 834,687. PATENTED OCT. 30, 1906.
C. C. SIBLEY & G. A. LUTZ.
ELBOW FOR CONDUITS.
APPLICATION FILED OCT. 26, 1905.
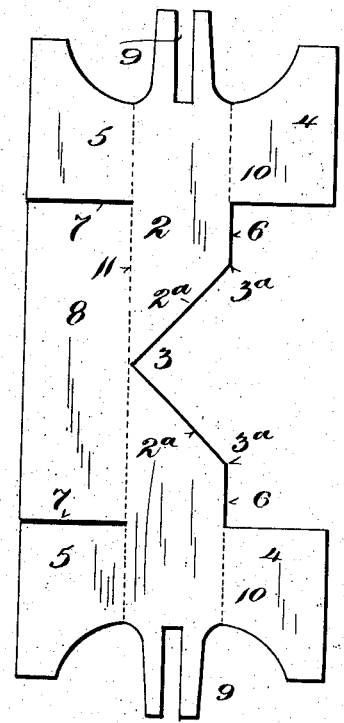
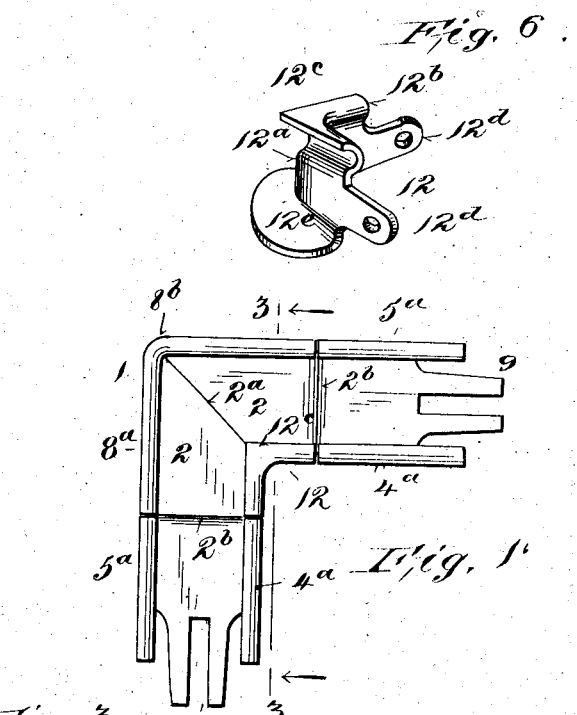
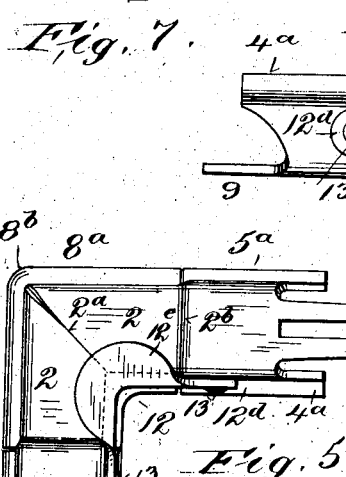
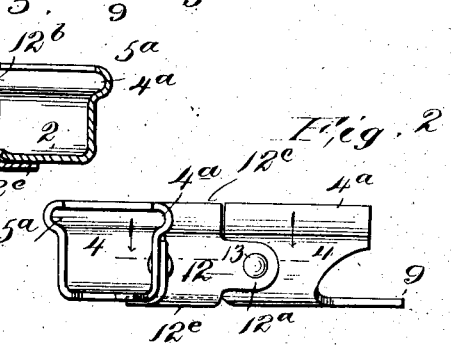
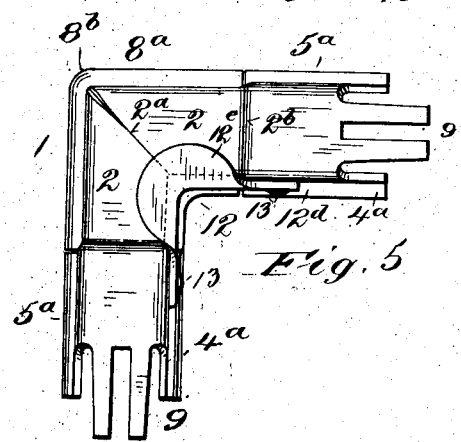
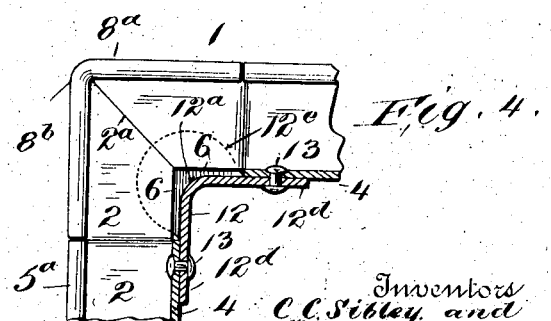
Witnesses
C. W. Benjamin
M. Hollingshead
Inventors
C. C. Sibley, and
G. A. Lutz.
By their Attorney
P. P. Bourne

UNITED STATES PATENT OFFICE.

CLARENCE C. SIBLEY, OF PERTH AMBOY, NEW JERSEY, AND GEORGE A. LUTZ, OF NEW YORK, N. Y.

ELBOW FOR CONDUITS.

No. 834,687.      Specification of Letters Patent.      Patented Oct. 30, 1906.

Application filed October 26, 1905. Serial No. 284,473.

*To all whom it may concern:*

Be it known that we, CLARENCE C. SIBLEY, a resident of Perth Amboy, Middlesex county, New Jersey, and GEORGE A. LUTZ, a resident of New York city, borough of Brooklyn, New York, citizens of the United States, have invented certain new and useful Improvements in Elbows for Conduits, of which the following is a specification.

Our invention relates to improvements in elbows that are adapted for use in connection with conduits for electric wires, such conduits being of the class shown in the patent to E. D. Page, dated February, 5, 1901, No. 667,567; and the invention has for its object to permit wires to be drawn around the inner angle or edge of the elbow without injury to the insulation on the wires, while permitting the covers of the conduits connected with the ends of the elbow to be pushed along the latter, so as to completely cover the angular channel therein and protect the contained wires.

The invention comprises the novel details of improvement that will be more fully hereinafter set forth and then pointed out in the claims.

Reference is to be had to the accompanying drawings, forming part hereof, wherein—

Figure 1 is a plan view of an elbow embodying our invention. Fig. 2 is an edge view thereof looking from the bottom of Fig. 1. Fig. 3 is a sectional view on the line 3 3 in Fig. 1. Fig. 4 is a plan view, partly in section, on the line 4 4 in Fig. 2. Fig. 5 is an inverted plan view of the elbow. Fig. 6 is a detail perspective view of the corner-piece at the inner angle of the elbow, and Fig. 7 is a face view of a blank from which the main part of the elbow may be produced.

Similar numerals of reference indicate corresponding parts in the several views.

As shown in the drawings, the elbow 1 is made generally in the form of sheet metal bent up to form a channel having the bottom 2 and side walls, the upper portions of which walls are bent to form grooves to receive the covers from conduits shaped in cross-section substantially the same as the elbow 1, such as are more particularly set forth in said patent to Page. In producing the elbow we take a blank of suitable sheet metal and stamp or cut the same substantially as shown in Fig. 7, providing thereby a substantially V-shaped opening at 3, side wings 4 5 at opposite ends of the blank, the wings 4 being located at a suitable distance from the edges 3ª of the cut-out part 3, providing spaces at 6, and on the side opposite the cut 3 are transverse slits 7, forming a wall 8, and at the ends of the bottom wall 2 one or more prongs 9 may be provided that are adapted to be bent and passed through slots in the adjacent ends of the conduits for fastening the latter firmly to the elbow. The outer edges of the wings 4 5 are bent into groove form at 4ª 5ª, and the outer edge of the wall 8 is bent in similar groove form at 8ª, and the wings 4 5 and wall 8 are bent along the dotted lines 10 11 into channel form, and then the blank so formed is bent substantially at right angles, so that the edges 2ª of the bottom 2 may meet or abut, as in Figs. 1, 4, and 5, the wall 8 being thereby likewise bent, forming a shape angle at 8ᵇ, the corresponding grooves 4ª 5ª thereby being opposed, as shown in Fig. 2. In the form shown the channels of the elbow are at a right angle; but it will be obvious that if any other angle is desired the cut-out part or angle 3 will be correspondingly shaped, so that when the parts of the elbow are bent around to bring the edges 2ª together the channels of the elbow will extend at the desired angle to each other. The sharp angle 8ᵇ permits the covers from the connected conduits to be pushed along the elbow so as to fully cover the channels at all parts.

As shown in Fig. 4, the inner edges of the wings or walls 4 are at a distance from each other at the inner angle, owing to the cut-away parts or spaces 6, and we provide for this space a filling piece or block 12, which has a rounded corner at 12ª, that is located below the plane of the grooves in the side walls and is diametrically opposed to the sharp corner 8ᵇ, whereby the wires may be drawn around such rounded corner 12ª without injury to the insulation. (See Figs. 4 and 6.) In making the corner-piece 12 we cut a sheet-blank into suitable form and bend it to provide the rounded corner 12ª, grooved portions 12ᵇ, (shown at right angles to each other above the corner 12ª,) forming a horizontally-extending lip 12ᶜ, outwardly-extending lugs 12ᵈ, and an inwardly-extending web or lug 12ᵉ under the corner 12ª. This corner-piece is fitted in the corner or space between the walls or wings 4, the rounded corner 12ª entering said space, and the lugs 12ᵈ overlie said wings and are secured thereto by rivets or the like 13, and the web or lug 12ᵇ is laid under the corner of the bottom wall 2 to cover the space at the inner corner, said corner-piece serving thereby to strengthen the elbow. The grooves 12ᵇ of the corner-piece 12 are opposed to the corresponding grooves 8ª and receive the covers from the connected conduits.

The outer portions of the bottom 2 of the elbow that carry the wings 4 5 may be bent down slightly, as indicated at 2ᵇ, and the wings 4 5 may be offset slightly from the planes of the grooves 8ª 12ᵇ, so that the conduits may be passed into the elbow between the wings 4 5, the grooves 4ª 5ª receiving the corresponding grooved portions on the conduits, so that the covers from the conduits may slide directly therefrom into the corresponding grooves 8ª 12ᵇ and the prongs 9 be bent up through slots in the bottom walls of the conduit and folded back to firmly connect the conduits to the elbow, or the grooves 4ª 5ª may aline with the corresponding grooves 8ª 12ᵇ and the conduits be brought against the ends of the elbow and held by the prongs 9. If preferred, the prongs 9 may be dispensed with and the ends of the conduits connected with the ends of the elbow by a suitable bond or clamp.

An elbow constructed as above described will be strong and serviceable for the purpose intended, and by having the rounded corner 12ª beneath the plane of the grooves the covers from the conduits may be passed to the full length along the elbow to cover the wires, while the latter may be drawn around the corner 12ª without injury to the insulation.

While we have shown a preferred form of making a blank for the elbow and bending the same, as described, it will be understood that we do not limit our invention to the particular details shown and described, as they may be varied without departing from the spirit of the invention.

Having now described our invention, what we claim is—

1. An elbow of the class described comprising material in channel form provided with opposed grooves and having a wall bent into a sharp corner at the outer side and also having a rounded corner at the inner side, substantially as described.

2. An elbow comprising material in channel form having members extending at an angle to each other, the outer side wall being bent into sharp angle and the opposed inner corner being rounded, substantially as described.

3. An elbow comprising material bent into channel form having a bottom and side walls, and an open top, the side walls having opposed grooves, the outer side wall being bent at a sharp angle, and the inner opposed side wall being rounded, substantially as described.

4. An elbow comprising material bent to form a bottom and side walls providing two members at an angle to each other, said side walls having opposed grooves, the inner corner being rounded between the adjacent grooves and the bottom, substantially as described.

5. An elbow comprising material bent to form a bottom and side walls providing two members at an angle to each other, a space being formed between the inner side walls, a corner-piece having a rounded surface being set in said space and secured to the material of the elbow, the opposed outer wall being bent at an angle, substantially as described.

6. An elbow comprising material bent to form a bottom and side walls providing two members at an angle to each other, a space being formed between the inner side walls, a corner-piece having a rounded surface being set in said space and secured to the material of the elbow, the opposed outer walls being bent at an angle, said corner-piece having grooves above the rounded surface, and said walls having grooves, substantially as described.

7. An elbow comprising material bent to form a bottom and side walls providing two members at an angle to each other, a space being formed between the inner side walls, a corner-piece having a rounded surface being set in said space and secured to the material of the elbow, the opposed outer walls being bent at an angle, said corner-piece having grooves above the rounded surface, and a lug beneath the rounded surface extending under the bottom, and said walls having grooves, substantially as described.

8. An elbow comprising a piece of metal having an angular cut in one side forming bottom members, a wall on the side opposite said cut portion, and walls at the end portions of said bottom members, said walls being bent outwardly and the whole piece bent at an angle forming two channels at an angle to each other, and a corner-piece secured in the space between two side walls, substantially as described.

9. An elbow comprising a piece of metal having an angular cut in one side forming bottom members, a wall on the side opposite said cut portion, and walls at the end portions of said bottom members, said walls being bent outwardly and the whole piece bent at an angle forming two channels at an angle to each other, and a corner-piece secured in the space between two side walls, the side walls and said corner-piece being provided with grooves, substantially as described.

10. An elbow comprising a piece of metal having an angular cut in one side forming bottom members, a wall on the side opposite said cut portion, and walls at the end portions of said bottom members, said walls being bent outwardly and the whole piece bent at an angle forming two channels at an angle to each other, and a corner-piece secured in the space between two side walls, the side walls and said corner-piece being provided with grooves, said corner-piece having a lug extended under the bottom members, substantially as described.

CLARENCE C. SIBLEY.
GEO. A. LUTZ.

Witnesses:
T. F. BOURNE,
M. HOLLINGSHEAD.